US008058355B2

(12) United States Patent  (10) Patent No.: US 8,058,355 B2
Eagan et al.  (45) Date of Patent: Nov. 15, 2011

(54) MODIFIED CHLORINATED CARBOXYLATED POLYOLEFINS AND THEIR USE AS ADHESION PROMOTERS

(75) Inventors: Robert Lee Eagan, Kingsport, TN (US); Kevin Alan Williams, Kingsport, TN (US); Allen Morgan Cheek, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 1079 days.

(21) Appl. No.: 11/218,071

(22) Filed: Aug. 31, 2005

(65) Prior Publication Data

US 2006/0074181 A1  Apr. 6, 2006

Related U.S. Application Data

(60) Provisional application No. 60/616,265, filed on Oct. 6, 2004.

(51) Int. Cl.
   *C08F 8/20* (2006.01)
   *C08F 8/14* (2006.01)
   *C09D 151/06* (2006.01)
   *C09D 123/28* (2006.01)

(52) U.S. Cl. ......... 525/334.1; 525/64; 525/72; 525/80; 525/329.5; 525/330.3; 525/355; 525/356; 525/359.1; 525/384; 525/386; 524/500; 428/500

(58) Field of Classification Search .............. 525/64, 525/72, 80, 329.5, 330.3, 334.1, 355, 356, 525/359.1, 384, 386; 524/500; 428/500
See application file for complete search history.

(56) References Cited

U.S. PATENT DOCUMENTS

| 3,579,485 | A | 5/1971 | Folzenlogen et al. |
| 3,579,486 | A | 5/1971 | McConnell et al. |
| 3,642,722 | A | 2/1972 | Knowles et al. |
| 4,033,889 | A | 7/1977 | Kiovsky |
| 4,070,421 | A | 1/1978 | Etter, Jr. |
| 4,146,590 | A | 3/1979 | Yamamoto et al. |
| 4,229,754 | A | 10/1980 | French |
| 4,286,047 | A | 8/1981 | Bennett et al. |
| 4,299,754 | A | 11/1981 | Shiomi et al. |
| 4,303,697 | A | 12/1981 | Baseden |
| 4,461,809 | A | 7/1984 | Shiomi et al. |
| 4,506,056 | A | 3/1985 | Gaylord |
| 4,632,962 | A | 12/1986 | Gallucci |
| 4,698,395 | A | 10/1987 | Inoue et al. |
| 4,727,120 | A | 2/1988 | Nogues |
| 4,762,890 | A | 8/1988 | Strait et al. |
| 4,788,264 | A | 11/1988 | Ukita |
| 4,857,600 | A | 8/1989 | Gross et al. |
| 4,880,849 | A | 11/1989 | Poole et al. |
| 4,927,888 | A | 5/1990 | Strait et al. |
| 4,954,573 | A | 9/1990 | Fry et al. |
| 4,966,947 | A * | 10/1990 | Fry et al. ............... 525/327.6 |
| 4,968,559 | A | 11/1990 | Kuroda et al. |
| 4,987,190 | A | 1/1991 | Keogh |
| 4,997,882 | A * | 3/1991 | Martz et al. ............. 525/65 |
| 4,999,403 | A | 3/1991 | Datta et al. |
| 5,001,197 | A | 3/1991 | Hendewerk |
| 5,021,510 | A | 6/1991 | Vroomans |
| 5,030,681 | A | 7/1991 | Asato et al. |
| 5,059,658 | A | 10/1991 | Sezume et al. |
| 5,102,956 | A | 4/1992 | Holmes-Farley |
| 5,109,097 | A | 4/1992 | Klun et al. |
| 5,118,567 | A | 6/1992 | Komiyama |
| 5,130,371 | A | 7/1992 | Fujita et al. |
| 5,135,984 | A | 8/1992 | Kinosada et al. |
| 5,137,975 | A | 8/1992 | Kelusky |
| 5,143,976 | A | 9/1992 | Ashihara et al. |
| 5,218,029 | A | 6/1993 | Brook |
| 5,227,198 | A | 7/1993 | Laura et al. |
| 5,262,075 | A | 11/1993 | Chung et al. |
| 5,286,799 | A | 2/1994 | Harrison et al. |
| 5,290,954 | A | 3/1994 | Roberts et al. |
| 5,300,363 | A | 4/1994 | Laura et al. |
| 5,310,806 | A | 5/1994 | Wild et al. |
| 5,346,963 | A | 9/1994 | Hughes et al. |
| 5,360,862 | A | 11/1994 | Roberts et al. |

(Continued)

FOREIGN PATENT DOCUMENTS

EP  0355895 A2  2/1990

(Continued)

OTHER PUBLICATIONS

"Raw Materials Index," Apr. 1991, pp. 1-77, Set #2, National Paint & Coatings Association, Washington, DC. "Colour Index," 1982, pp. 5216, 5227-5228, 5230, 5237-5238, 5245, 5247; 3d Ed., 2d Rev., Society of Dyers and Colourists in association with the American Association of Textile Chemists and Colorists.
Notification of Transmittal of the International Search Report and the Written Opinion of the International Searching Authority, or the Declaration date of mailing Feb. 13, 2006.
Principles of Polymerization, George Odian, 1970, p. 97.
Notification of Transmittal of the International Search Report or the Declaration for related PCT/US02/03518, Mar. 2003.

(Continued)

*Primary Examiner* — Roberto Rabago
(74) *Attorney, Agent, or Firm* — Dennis V. Carmen; Bernard J. Graves, Jr.

(57) ABSTRACT

The present invention provides solvent- and water-based primer compositions that include at least one chlorinated carboxylated polyolefin that has been modified with one or more polyfunctional alcohols. The chlorinated carboxylated polyolefins are obtained by the reaction of polyolefins with at least one of unsaturated carboxylic esters, unsaturated carboxylic acids, unsaturated carboxylic anhydrides, acrylic monomers, and mixtures thereof then chlorinated. The chlorinated carboxylated polyolefins are then further modified by reaction with one or more polyfunctional alcohols. These polyfunctional alcohol-modified chlorinated carboxylated polyolefins may also contain pendant carboxyl groups, which have the propensity to form hydrophilic salts with amines or inorganic bases, thereby rendering the polyfunctional alcohol-modified chlorinated carboxylated polyolefins water-dispersible. These primer compositions are useful for significantly improving the adhesion of paints, adhesives, and inks to various plastic and metal substrates.

51 Claims, No Drawings

U.S. PATENT DOCUMENTS

| | | | |
|---|---|---|---|
| 5,367,022 A | | 11/1994 | Kiang et al. |
| 5,369,170 A | | 11/1994 | Weinkauf |
| 5,373,048 A | | 12/1994 | Witzeman et al. |
| 5,412,029 A | | 5/1995 | Elm et al. |
| 5,420,303 A | | 5/1995 | Roberts et al. |
| 5,424,367 A | | 6/1995 | Auda et al. |
| 5,427,856 A | | 6/1995 | Laura et al. |
| 5,436,079 A | | 7/1995 | Brugel |
| 5,461,113 A | | 10/1995 | Marczinke et al. |
| 5,523,358 A | | 6/1996 | Hirose et al. |
| 5,550,195 A | | 8/1996 | Harris et al. |
| 5,587,418 A | | 12/1996 | Sasaki et al. |
| 5,620,747 A | | 4/1997 | Laura et al. |
| 5,626,915 A | | 5/1997 | Laura et al. |
| 5,629,046 A | | 5/1997 | Laura et al. |
| 5,650,468 A | | 7/1997 | Vandevijver et al. |
| 5,651,927 A | | 7/1997 | Auda et al. |
| 5,663,266 A | | 9/1997 | Taylor et al. |
| 5,693,423 A | | 12/1997 | Laura et al. |
| 5,709,946 A | | 1/1998 | Jackson et al. |
| 5,728,767 A | * | 3/1998 | Kanetou et al. ............... 524/504 |
| 5,728,776 A | | 3/1998 | Takemura et al. |
| 5,756,566 A | | 5/1998 | Laura |
| 5,759,703 A | | 6/1998 | Neymark et al. |
| 5,801,219 A | | 9/1998 | Neymark et al. |
| 5,804,640 A | | 9/1998 | Laura et al. |
| 5,811,489 A | | 9/1998 | Shirai et al. |
| 5,821,301 A | | 10/1998 | Tsuneka et al. |
| 5,863,646 A | | 1/1999 | Verardi et al. |
| 5,880,190 A | | 3/1999 | Laura |
| 5,910,530 A | | 6/1999 | Wang et al. |
| 5,912,296 A | | 6/1999 | Wang et al. |
| 5,955,547 A | | 9/1999 | Roberts et al. |
| 5,969,050 A | | 10/1999 | Vandevijver et al. |
| 6,001,469 A | | 12/1999 | Verardi et al. |
| 6,046,279 A | | 4/2000 | Roberts et al. |
| 6,184,264 B1 | | 2/2001 | Webster |
| 6,218,476 B1 | | 4/2001 | Coe |
| 6,228,948 B1 | | 5/2001 | Flaris et al. |
| 6,262,182 B1 | | 7/2001 | Eagan et al. |
| 6,310,134 B1 | | 10/2001 | Templeton et al. |
| 6,426,389 B2 | | 7/2002 | Coe |
| 6,437,049 B1 | | 8/2002 | Bortolon et al. |
| 6,451,919 B1 | | 9/2002 | Aglietto et al. |
| 6,495,629 B2 | | 12/2002 | Usui et al. |
| 6,569,950 B2 | | 5/2003 | Kitano et al. |
| 6,586,525 B1 | | 7/2003 | Urata et al. |
| 6,586,532 B1 | | 7/2003 | Gauthy |
| 6,593,423 B1 | | 7/2003 | Kondos et al. |
| 6,649,694 B2 | | 11/2003 | Jordens et al. |
| 6,699,949 B2 | | 3/2004 | Chung |
| 6,723,796 B2 | | 4/2004 | Goldblatt et al. |
| 6,777,473 B1 | | 8/2004 | Collard et al. |
| 6,831,115 B2 | | 12/2004 | Williams et al. |
| 7,388,039 B2 | | 6/2008 | Williams et al. |
| 2001/0012876 A1 | | 8/2001 | Wayne |
| 2002/0026010 A1 | | 2/2002 | Roberts et al. |
| 2002/0151656 A1 | | 10/2002 | Williams et al. |
| 2002/0156144 A1 | | 10/2002 | Williams et al. |
| 2002/0198329 A1 | * | 12/2002 | Williams et al. ............ 525/329.7 |
| 2003/0004245 A1 | | 1/2003 | Scheibelhoffer et al. |
| 2003/0023002 A1 | | 1/2003 | Kojoh et al. |
| 2003/0208001 A1 | | 11/2003 | Gauthy |
| 2004/0054086 A1 | | 3/2004 | Schauder et al. |
| 2004/0059064 A1 | | 3/2004 | Usui et al. |
| 2005/0256272 A1 | | 11/2005 | Najima et al. |

FOREIGN PATENT DOCUMENTS

| | | | |
|---|---|---|---|
| EP | 369674 A1 | * | 5/1990 |
| EP | 0369674 A1 | | 5/1990 |
| EP | 0406855 A2 | | 1/1991 |
| EP | 0489495 A2 | | 6/1992 |
| EP | 0767186 B1 | | 4/1997 |
| EP | 1 036 817 A1 | | 9/2000 |
| EP | 1 153 996 A1 | | 11/2001 |
| GB | 1 548 525 | | 7/1979 |
| GB | 1548525 | * | 7/1979 |
| GB | 2 131 439 A | | 6/1984 |
| WO | 97/06836 | | 2/1997 |

OTHER PUBLICATIONS

Notification of Transmittal of the International Search Report or the Declaration for related PCT/US02/03775, Mar. 2003.
Office Action dated Sep. 19, 2005, in related U.S. Appl. No. 10/890,861, filed Jul. 14, 2004.
Office Action dated May 18, 2006, in related U.S. Appl. No. 10/890,861, filed Jul. 14, 2004.
Office Action dated Jan. 4, 2007, in related U.S. Appl. No. 10/890,861, filed Jul. 14, 2004.
Office Action dated Nov. 15, 2006, for related U.S. Appl. No. 10/610,238, filed Jun. 30, 2003.
Office Action dated Feb. 13, 2006, for related U.S. Appl. No. 10/610,238, filed Jun. 30, 2003.
Office Action dated Oct. 9, 2007, for related U.S. Appl. No. 10/610,238, filed Jun. 30, 2003.
Office Action dated Jun. 27, 2008, for related U.S. Appl. No. 10/610,238, filed Jun. 30, 2003.
Office Action dated Feb. 20, 2009, for related U.S. Appl. No. 10/610,238, filed Jun. 30, 2003.
Office Action dated Dec. 15, 2009, for related U.S. Appl. No. 10/610,238, filed Jun. 30, 2003.
Office Action dated Jul. 24, 2007, for related U.S. Appl. No. 10/890,861, filed Jul. 14, 2004.
Copending U.S. Appl. No. 10/610,238 filed Jun. 30, 2003.
Notification of Transmittal of the International Search Report or the Declaration dated Oct. 28, 2002 for Corresponding PCT/US02/24305.
Office Action dated Jul. 8, 2010, for related U.S. Appl. No. 10/610,238 filed Jun. 30, 2003.
Notice of Allowance dated Mar. 8, 2011, for related U.S. Appl. No. 10/610,238 filed Jun. 30, 2003.

* cited by examiner

MODIFIED CHLORINATED CARBOXYLATED POLYOLEFINS AND THEIR USE AS ADHESION PROMOTERS

CROSS-REFERENCE TO RELATED APPLICATIONS

This application claims priority to U.S. Provisional Application Ser. No. 60/616,265 filed Oct. 6, 2004 the disclosure of which is incorporated herein by reference in its entirety.

FIELD OF THE INVENTION

This invention relates to the field of coating compositions, and in particular, to modified polyolefins useful as primers.

BACKGROUND OF THE INVENTION

Molded plastic parts are widely used in automobiles, trucks, household appliances, graphic arts, and the like. Frequently these plastic parts are made from polyolefins such as polyethylene, ethylene copolymers, polypropylene, propylene copolymers, and polyolefin blends with other polymers. One such blend is a thermoplastic polyolefin (TPO), which is a rubber-modified polypropylene. Frequently, these plastic parts must be painted to match the color of painted metal parts that are also present in the automobile, appliance, or other item. Typical paints do not adhere well to these plastic parts. Thus, adhesion-promoting primers are needed to improve the adhesion of the paints to the polyolefin materials.

Although chlorinated polyolefins, particularly chlorinated, maleated crystalline polypropylene polymers, are effective for this purpose, they have very limited solubility in anything other than aromatic or chlorinated solvents. It is possible to improve the solubility of chlorinated polyolefins in various solvent by increasing the chlorine content of the chlorinated polyolefin. However increasing the chlorine content of chlorinated polyolefins often results in poor coating adhesion, especially after exposure to humidity and gasoline. In general, a chlorine content of greater than 24 wt.-% can result in poor adhesion after exposure to humidity and gasoline.

Attempts have been made to provide water-based paints and primers for the automotive and appliance industries, but these systems generally are not thought to be as effective as solvent-based systems. There have been several patents issued pertaining to the modification of polyolefins to provide an adhesion-promoting primer composition for paint topcoats onto polyolefin surfaces.

U.S. Pat. No. 4,146,590 describes reacting crystalline polyolefins in the molten state with an alicyclic carboxylic acid having a cis form non-conjugated double bond in the ring, such as cis-4-cyclohexene-1,2-dicarboxylic acid or endobicyclo [2,2,1]-5-heptene-2,3-dicarboxylic acid, or the anhydride of either; or an unsaturated carboxylic acid or anhydride, such as maleic anhydride or acrylic acid, resulting in a modified crystalline polyolefin having residual carboxylic acid monomer present. The polyolefin is thereafter reacted with a polyhydric alcohol or a polyamine, to thereby fix the residual monomer into the polymer. The crystalline nature of these modified polyolefins makes them practically insoluble in solvents used for liquid coatings, and therefore unsuitable for liquid coating compositions. These polymers are instead used as coatings in the solid state, requiring further heating, melting, and molding of the polymer. The fixing of the residual monomer to the polymer is taught to decrease the odor that would otherwise result from release of the monomer during the subsequent heating, melting, and molding of the polymer.

U.S. Pat. No. 4,299,754 describes a method for producing a modified propylene-ethylene copolymer, by graft copolymerization with maleic acid or anhydride. The propylene ethylene copolymer has a propylene content of 50 to 75 mole percent and a crystallinity, determined by an X-ray diffraction method, of 2 to 20%. The amount of maleic acid or maleic anhydride grafted is 0.5 to 15% by weight. The modified polymer has an intrinsic viscosity of at least 0.3, and is dissolved in the organic solvent in a concentration of 10 to 100 kg/m$^3$ of solvent. The resulting treating agent is suitable as an undercoat of the polyolefin articles and permits coating of a paint with markedly improved adhesion.

U.S. Pat. No. 4,461,809 describes a surface-treating agent used as an undercoat on the surface of a polyolefin shaped article to be coated with paint. This surface-treating agent is composed of a solution of a modified polymer in organic solvent. The modified polymer is prepared by graft copolymerization of a propylene-ethylene copolymer with an alkyl ester of a monolefinic dicarboxylic acid. The alkyl moiety of the alkyl ester is described by the general formula $C_nH_{2n+1}$, such as methyl, ethyl, n-propyl, n-butyl, isopropyl, octyl, or 2-ethylhexyl.

U.S. Pat. No. 4,632,962 describes a method for graft modifying a polyolefin with hydroxyl functional groups through an imide linkage. These modified polyolefins are made by grafting an anhydride functional group to a polyolefin chain and then reacting the anhydride group with an amine substituted organic alcohol to produce an imide. The resulting imide group on the polyolefin contains hydroxyl groups for crosslinking with various topcoats. The polyolefins are taught to be useful to produce a thermoplastic molding composition.

U.S. Pat. No. 4,966,947 describes a method for graft modifying a chlorinated polyolefin with hydroxyl functional groups through an imide linkage. These modified polyolefins are made by grafting an anhydride functional group to a chlorinated polyolefin, and then reacting the anhydride group with an amine-substituted organic alcohol to produce an imide. The resulting imide group on the chlorinated polyolefin contains hydroxyl groups for crosslinking with various topcoats.

U.S. Pat. No. 4,997,882 describes an acid- or anhydride-grafted chlorinated polyolefin that has been reacted with a monoalcohol and a polyepoxide. The composition described in this patent is prepared by grafting an unsaturated acid or anhydride onto a chlorinated polyolefin to form an acid- or anhydride-modified chlorinated polyolefin resin. This resin is then reacted with an organic monohydric alcohol to form an esterified product containing acid functionality. The resulting esterified product is then further reacted with a polyepoxide to form the ungelled modified chlorinated polyolefin resin. The resulting product is then formulated into a coating composition for a thermoplastic polyolefin substrate.

U.S. Pat. No. 5,030,681 discloses a coating resin composition obtained by graft-polymerizing an unsaturated carboxylic acid to a chlorinated polyolefin in a solvent, esterifying all unsaturated carboxylic acid present in the reaction system, and mixing the obtained composition with a urethane prepolymer.

U.S. Pat. No. 5,135,984 describes a method for modifying a chlorinated polyolefin with maleic anhydride and an acrylic-modified hydrogenated polybutadiene. This method involves the graft copolymerization of the chlorinated polyolefin with the maleic acid anhydride and acrylate modified hydrogenated polybutadiene by heating the mixture in the presence of a peroxide initiator. This results in an acrylic- and maleic anhydride-modified chlorinated polyolefin.

U.S. Pat. No. 5,143,976 describes a resin composition containing graft copolymers of acrylic monomers (A) and polydiene (B) grafted onto a chlorinated polyolefin (C). The polyolefin resin compositions composed of the acrylic oligomers contain hydroxyl or carboxyl groups and/or certain acrylic oligomers.

U.S. Pat. No. 5,523,358 describes the grafting of various unsaturated monomers to polyolefins in which an organic solvent is used to swell the polyolefin during the grafting step.

U.S. Pat. No. 5,587,418 describes a method for producing a graft copolymer for use as a primeness colored basecoat on polyolefin surfaces. The graft copolymer is obtained by copolymerizing acrylic monomers, unsaturated carboxylic acids, and acrylic monomers containing hydroxyl groups, with certain chlorinated polyolefins.

U.S. Pat. No. 5,811,489 describes a method for producing a coating resin composition based on a graft-copolymerized resin. This coating resin composition comprises a graft copolymerized resin prepared by graft copolymerizing a monomer containing an ethylenic unsaturated bond, and a monomer containing both an ethylenic unsaturated bond and a hydroxyl group, onto a mixed resin of (1) a carboxyl group-containing chlorinated polyplefin resin obtained by graft copolymerizing an unsaturated carboxylic acid or anhydride onto a polyolefin followed by chlorination and (2) a chlorinated polyolefin resin obtained by simultaneously oxidizing and chlorinating a polyolefin using at least one oxidizing agent selected from air, oxygen and ozone, an isocyanate compound or an alkyl-etherified amino resin as a curing agent.

U.S. Pat. No. 5,863,646 describes a liquid coating composition comprising a mixture of a substantially saturated polyhydroxylated polydiene polymer, having terminal hydroxyl groups, with a chlorinated polyolefin, a film forming polymer, and a carrier material. The coating can be applied to plastic substrates to improve the adhesion of subsequently applied coatings.

U.S. Pat. No. 6,001,469 describes a composition similar to that described in U.S. Pat. No. 5,863,646, and describes its use as an adhesion promoting coating that can be applied directly onto thermoplastic and thermosetting plastic substrates.

European patent application 1036817 A1 discloses a polyamide-modified polyolefin composition, which is obtained by reacting an unsaturated carboxylic acid anhydride modified polyolefin, having a specified molecular weight range, with a polyamide, having a specified molecular weight range. The resulting composition is described as having excellent adherence to polyolefin substrates without tack.

U.S. Pat. No. 6,310,134, describes solvent-based primer compositions containing 0.5 to 40 weight percent of a modified polyolefin and a solvent selected from the group consisting of ester solvents, ketone solvents, aliphatic solvents, aromatic solvents, and mixtures thereof. The polyolefins described in this report have been graft-modified with unsaturated acids, anhydrides, or esters. These modified polyolefins are reported to have good utility as primers for polyolefins substrates when topcoated with melamine based and 2-part polyurethane paints. Although these modified polyolefins provide good initial crosshatch adhesion of melamine based topcoats and good solvent resistance after application, they are deficient in water resistance, especially under high temperature and humidity conditions.

U.S. Pat. No. 6,262,182 describes a solution process for the modification of certain polyolefins with an unsaturated anhydride, unsaturated acid or unsaturated ester.

U.S. Pat. No. 6,593,423 describes a graft copolymer formed from the reaction of a halogenated polyolefin polymer with a hydroxyl-terminated polybutadiene.

U.S. Patent App. No. 20020151656 describes the modification of non-chlorinated carboxylated polyolelfins with polyfunctional alcohols and their use as primers for improving the adhesion of a coating to a plastic substrate.

SUMMARY OF THE INVENTION

The present invention provides polyfunctional alcohol-modified chlorinated carboxylated polyolefins, and their use in solvent- and water-based, adhesion-promoting primer compositions. The polyfunctional alcohol-modified chlorinated carboxylated polyolefins of the present invention are prepared by reacting polyolefins with unsaturated carboxylic esters, unsaturated carboxylic acids, unsaturated carboxylic anhydrides, vinyl monomers, acrylic monomers, or mixtures thereof, to provide a carboxylated polyolefin. The carboxylated polyolefins are then chlorinated by reaction with at least one chlorinating agent. The chlorinated carboxylated polyolefins are then further modified by reaction with one or more polyfunctional alcohols. These modifications provide chlorinated polyolefins with improved solubility in typical coating solvents without sacrificing adhesion performance, in particular, on exposure to gasoline, and are useful in solvent- and water-based coating compositions, ink compositions, and adhesive compositions.

DETAILED DESCRIPTION OF THE INVENTION

Before the present compositions of matter and methods are disclosed and described, it is to be understood that this invention is not limited to specific methods or to particular formulations, except as indicated, and as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

The terms "modified chlorinated carboxylated polyolefins" and "modified polyolefins" are equivalent to the term "polyfunctional alcohol-modified chlorinated carboxylated polyolefins".

The present invention provides polyfunctional alcohol-modified chlorinated carboxylated polyolefins and their use in solvent- and water-based, adhesion-promoting primer compositions. Thus, in a first embodiment, the present invention provides a polyfunctional alcohol-modified chlorinated carboxylated polyolefin comprising the reaction product of at least one chlorinated carboxylated polyolefin with at least one polyfunctional alcohol.

The chlorinated carboxylated polyolefins are typically prepared by reacting polyolefins with unsaturated carboxylic esters, unsaturated carboxylic acids, unsaturated carboxylic anhydrides, vinyl monomers, acrylic monomers, or mixtures thereof. The carboxylated polyolefins are then chlorinated by reaction with at least one chlorinating agent. The chlorinating agent can be any known in the art capable of chlorinating polyolefins. However, the order of these two steps is not critical to the invention. Chlorinated carboxylated polyolefins useful in this invention can also be prepared by chlorinating the polyolefin prior to the introduction of the carboxyl-containing compounds. The chlorinated carboxylated polyolefins are then further modified by reaction with one or more polyfunctional alcohols.

The polyolefins useful as starting materials in the present invention include ethylene copolymers prepared from ethylene and alpha olefins having 3 to about 10 carbon atoms, polypropylene, propylene copolymers prepared from ethylene or alpha olefins having from 4 to about 10 carbon atoms, poly(1-butene), 1-butene copolymers prepared from ethylene or alpha olefins having 3 to about 10 carbon atoms, propylene terpolymers prepared from ethylene and/or alpha olefins having from 4 to about 10 carbon atoms, and the like. In addition, mixtures of the previously mentioned polyolefins may be used in this process, as opposed to using a single polyolefin.

Exemplary monomers useful in the carboxylation of the starting material polyolefin include unsaturated carboxylic esters, unsaturated carboxylic acids, unsaturated carboxylic anhydrides, vinyl monomers, and acrylic monomers. In one embodiment, such monomers include, but are not limited to, maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate, methyl acrylate, hydroxyethyl acrylate, ethyl acrylate, methyl methacrylate, ethyl methacrylate, methyl crotonate, ethyl crotonate, hydroxyethyl acrylate, hydroxyethyl methacrylate, hydroxypropyl acrylate, hydroxypropyl methacrylate, and mixtures thereof.

Preferably, the concentration of the carboxylating monomer is in the range of from about 1 to about 25 weight percent based on the weight of polyolefin. A more preferred range is from about 2 to about 20 weight percent. A range of about 4 to about 18 weight percent is especially preferred.

The monomers are readily grafted to polyolefins, in the solution or melt phase, using radical initiators such as organic peroxides or azo compounds as the initiator. In one embodiment, the monomers are grafted to the polyolefin in a solution process according to the procedure described in U.S. Pat. No. 6,262,182, incorporated herein by reference. Solvents with relatively low boiling points are typically easier to remove and consequently more desirable for use in this process. Preferred solvents include chlorobenzene (b.p. 132° C.), tert-butylbenzene (b.p. 169° C.), and anisole (b.p. 154° C.). In another embodiment, the monomers are grafted to the polyolefin in an extrusion process according to the procedure described U.S. Pat. No. 6,046,279, incorporated herein by reference.

The carboxylated polyolefins useful in this invention are further reacted with at least one chlorinating agent to generate a chlorinated carboxylated polyolefin. If desired, the carboxylated polyolefin prepared via the solution process described above may be chlorinated in the solvent used to prepare the carboxylated polyolefin. Alternatively, solvent may be removed from the carboxylated polyolefin and replaced with any suitable solvent for the reaction with chlorine. Carboxylated polyolefins prepared via the extrusion process described previously will typically be dissolved in a suitable solvent prior to the chlorination reaction. In one embodiment, the carboxylated polyolefins are chlorinated as described in U.S. Pat. No. 4,954,573, incorporated herein as reference. In another embodiment, the carboxylated polyolefins are chlorinated as described in U.S. Pat. No. 5,436,079, incorporated herein as reference. The chlorine content of the chlorinated carboxylated polyolefin useful in this invention ranges from about 1 wt. % up to about 40 wt. %, and preferably from 5 wt. % up to 35 wt. %.

In the process of the present invention, the chlorinated carboxylated polyolefin is further reacted with one or more polyfunctional alcohols. Suitable alcohols will have at least two hydroxyl groups or at least one hydroxyl group and another functional group capable of preferentially reacting with the chlorinated carboxylated polyolefin. Such preferentially reactive functional groups include amino, epoxy, and the like. In one embodiment of the invention, at least one hydroxyl group of the polyfunctional alcohol remains essentially unreacted with the chlorinated carboxylated polyolefin.

Exemplary polyfunctional alcohols include, but are not limited to, trimethylolethane, pentaerythritol, trimethylolpropane, 1,6-hexanediol, 1,4-cyclohexanediol, 1,2-propylene glycol, 1,3-propylene glycol, neopentyl glycol, 1,4-cyclohexanedimethanol, 2,2,4-trimethyl-1,3-pentanediol, 2-ethyl-1,3-hexanediol, 2-butyl-2-ethyl-1,3-propanediol, 2,2-dibutyl-1,3-propanediol, 2-methyl-2-propyl-1,3-propanediol, 2,2-diethyl-1,3-propanediol, ethylene glycol, diethylene glycol, triethylene glycol, polyethylene glycols, glycerol, polyester polyols, acrylic polyols, polyurethanepolyols, glucose, sucrose, 2-amino-1-propanol, ethanolamine, 2-amino-2-methyl-1-propanol, tris(hydroxymethyl)methylamine, 2,2-dimethyl-3-amino-1-propanol, and the like. In one embodiment, the polyfunctional alcohol is selected from a group comprising 2-ethyl-1,3-hexanediol, 2,2,4-trimethyl-1,3-pentanediol, 2-butyl-2-ethyl-1,3-propanediol, neopentyl glycol, and 1,6-hexanediol. Especially preferred are those polyfunctional alcohols having one primary hydroxyl group, and one secondary or tertiary hydroxyl group and polyfunctional alcohols based on 1,3-propanediol which are doubly substituted at the middle carbon position (C-2). These especially preferred polyfunctional alcohols include, but are not limited to, 2-ethyl-1,3-hexanediol, 2,2,4-trimethyl-1,3-pentanediol, 1,2-propylene glycol, neopentyl glycol, 2-butyl-2-ethyl-1,3-propanediol, 2,2-dibutyl-1,3-propanediol, 2,2-diethyl-1,3-propanediol, and 2-methyl-2-propyl-1,3-propanediol. The amount of polyol used to modify the chlorinated carboxylated polyolefin will generally be in the range of about 0.01 to about 60 weight %, based on the weight of the chlorinated carboxylated polyolefin.

The reaction of the chlorinated carboxylated polyolefin with the polyfunctional alcohol may be carried out in the presence or absence of a solvent. When using a solvent, the reaction is conducted at temperatures in the range of about 10° C. to about 200° C. The reaction temperature chosen will affect the time necessary to complete the reaction. Exemplary solvents include, but are not limited to, aromatic hydrocarbon solvents, such as, benzene, toluene, xylene, tert-butylbenzene; chlorinated solvents, such as, chlorobenzene; aliphatic hydrocarbon solvents, such as, naphtha, mineral spirits, and hexane; and ester solvents, such as, propyl acetate and butyl acetate. Mixtures of solvents may be used if desired.

If desired, the polyfunctional alcohol may be reacted with the chlorinated carboxylated polyolefin in the solvent used to prepare the chlorinated carboxylated polyolefin. Alternatively, solvent may be removed from the chlorinated carboxylated polyolefin and replaced with any suitable solvent for the reaction with the polyfunctional alcohol.

If the chlorinated carboxylated polyolefin contains anhydride groups, no catalyst is required to react this material with the polyfunctional alcohols to yield the corresponding monoester and half acid groups. However, a catalyst, such as, for example, an alkyl or arylalkyl sulfonic acid may be used to increase the rate of reaction of the polyfunctional alcohol with the chlorinated carboxylated polyolefin. Also, if desired, the remaining half acid groups on the polyolefin may then be further reacted with polyfunctional alcohol in the presence of excess polyfunctional alcohol and at higher temperature to yield the corresponding diester. A catalyst may or may not be needed to completely esterify all of the half acid groups.

If the chlorinated carboxylated polyolefin is prepared by grafting an ester monomer such as dimethyl maleate to the polyolefin substrate, then it may be desirable to use a catalyst such as a titanium catalyst in order to facilitate the reaction of the polyfunctional alcohol with the chlorinated carboxylated polyolefin. Suitable titanium catalysts include, but are not limited to, titanium tetraisopropoxide, titanium tetraisobutoxide, and the like.

The polyfunctional alcohol-modified chlorinated carboxylated polyolefin resins are soluble in typical coating solvents, such as, for example, toluene, xylene, naphtha, mineral spirits, hexane, and ester solvents such as propyl acetate and butyl acetate as well as ketones such as methyl amyl ketone. Mixtures of solvents may be used if desired.

The polyfunctional alcohol-modified chlorinated carboxylated polyolefins of the present invention may also contain pendant carboxylic acid groups, which have the propensity to form hydrophilic salts with amines and therefore may allow the modified chlorinated carboxylated polyolefins of the present invention to be rendered water-dispersible. The modified chlorinated carboxylated polyolefin may contain a combination of both hydroxyester and carboxylic acid functional groups. For example, this can be accomplished by reacting an anhydride functional chlorinated carboxylated polyolefin with 2,2,4-trimethyl-1,3-pentanediol or 2-ethyl-1,3-hexanediol to yield a modified chlorinated carboxylated polyolefin containing both hydroxyester and carboxylic acid functional groups.

It is readily understood by one skilled in the art that the modified chlorinated carboxylated polyolefins, having pendant carboxyl groups, may also be rendered water-dispersible by neutralization of at least a portion of the carboxyl groups with an amine (organic amine or ammonia) or other inorganic base (i.e., sodium hydroxide, potassium hydroxide, etc.). These modified chlorinated carboxylated polyolefins may be dispersed by emulsifying the modified chlorinated carboxylated polyolefin in the presence of an amine, or other inorganic base, and water; depending on molecular weight and acid number, it may be desirable or even necessary to utilize at least one surfactant, at least one amine, and water. This method for dispersing carboxylated polyolefins is described in U.S. Pat. No. 5,373,048, incorporated herein by reference.

One group of surfactants useful in this invention may be broadly described as nonionic surfactants. The surfactants may have a molecular weight of up to 500 or greater and may include polymeric materials. The surfactants include materials that contain groups of varying polarity whereby one part of the molecule is hydrophilic and the other part of the molecule is hydrophobic. Examples of such materials include, but are not limited to, ethoxylated alkyl phenols and ethoxylated aliphatic alcohols (primary and secondary). Preferably, the surfactant is an ethoxylated primary alcohol having 12 to 15 carbon atoms in the precursor alcohol or an ethoxylated secondary alcohol having 11 to 15 carbon atoms in the precursor alcohol. Examples of ethoxylated alkyl phenol surfactants include, but are not limited to, IGEPAL® CO-710 sold by the Stepan Company, TERGITOL® NP-9, and TERGITOL® NP-40—both sold by Dow Chemical Company. Examples of ethoxylated primary alcohols include NEODOL® 25-9 and NEODOL® 25-12 sold by Shell Chemical Company. Examples of ethoxylated secondary alcohols include TERGITOL® 15-S-9 and TERGITOL® 15-S-15 sold by Dow Chemical Company. The amount of surfactant is broadly in the range of 0 to about 50 weight percent and is preferably in the range of 0 to 25 weight percent, based on the weight of the modified chlorinated carboxylated polyolefin. Other examples of surfactants include those described in U.S. Pat. No. 5,663,266, incorporated herein by reference.

The amine may be a primary, secondary, or tertiary amine. The amine may be aromatic or aliphatic, but aliphatic amines are preferred. Typical amines include, but are not limited to, ammonia, ammonium hydroxide, triethylamine, diethylamine, monoethanolamine, monoisopropanolamine, morpholine, ethanolamine, diethanolamine, triethanolamine, N,N-dimethylethanolamine, N,N-diethylethanolamine, N-methyl-diethanolamine, 2-amino-2-methyl-1-propanol and the like. Other examples of amines include those described in U.S. Pat. No. 5,373,048, incorporated herein by reference.

Inorganic bases that may be used include sodium hydroxide, potassium hydroxide, sodium carbonate, potassium carbonate, and the like.

The amount of amine or inorganic base to be used in preparing the aqueous dispersion of the polyfunctional alcohol-modified chlorinated carboxylated polyolefin will be such that from about 10 to about 200%, and preferably from 50-120% of the available carboxyl groups are effectively neutralized.

The amount of water may vary widely and there is no upper limit on the amount of water used. There may be a lower limit on the amount of water because sufficient water should be present in the composition to result in the formation of an admixture of the components. In one embodiment of the invention, there is at least 50 weight percent water in the composition, based on the weight of the total composition.

As noted previously, the polyfunctional alcohol-modified chlorinated carboxylated polyolefins of the invention are especially useful as primers for coating substrates which suffer from poor paint adhesion. Accordingly, such resins may be applied to a substrate (e.g. plastic or metal), allowed to dry, and a conventional topcoat coating composition applied thereto. The the modified chlorinated carboxylated polyolefins may be used as prepared in solvent, or may be further diluted with any of the solvents listed previously. Aqueous dispersions of the modified chlorinated carboxylated polyolefins may also be applied to the substrate as prepared, or they may be further diluted with water. If desired, a co-solvent may be utilized to dilute the aqueous dispersions of the modified chlorinated carboxylated polyolefins. In this regard, suitable co-solvents for the water-borne compositions of the present invention include, but are not limited to, methanol, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents.

Alternatively, the modified chlorinated carboxylated polyolefins of the invention may be blended with various solvent-borne or water-borne coating compositions to afford a self-priming composition useful for coating such substrates. In this regard, such solvent-borne or water-borne coating compositions may be any coating composition, typically comprised of any number of traditional coating resins, for example, polyesters, acrylics, styrene-acrylics, urethanes, alkyds, acrylic-modified alkyds, epoxies, etc. In addition, such compositions may also further comprise one or more typical coatings additives. Thus, as a further aspect of the present invention, there is provided a coating composition comprising the modified chlorinated carboxylated polyolefins of the present invention as described herein, further comprising one or more coatings additives, such as, for example, leveling, rheology, and flow control agents such as silicones, fluorocarbons or cellulosics; neutralized carboxylic acid-containing latex particles with highly crosslinked particles; associative thickeners; flatting agents; pigment wetting and dispersing agents and surfactants; ultraviolet (UV) absorbers; UV light stabilizers; tinting pigments; defoaming and antifoaming agents; anti-settling, anti-sag, and bodying agents; anti-skinning agents; anti-flooding and anti-floating agents; fungicides and mildewcides; corrosion inhibitors; thickening agents; or coalescing agents.

Specific examples of such additives can be found in Raw Materials Index, published by the National Paint & Coatings Association, 1500 Rhode Island Avenue, N.W., Washington, D.C. 20005.

Examples of flatting agents include, but are not limited to, synthetic silica, available from the Davison Chemical Division of W. R. Grace & Company under the trademark SYLOID®; polypropylene, available from Hercules Inc., under the trademark HERCOFLAT®; and synthetic silicate, available from J. M. Huber Corporation under the trademark ZEOLEX®.

Examples of dispersing agents and surfactants include, but are not limited to, sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxy-ethyl)-N-octadecyl sulfosuccinnamate, disodium N-octasulfosuccinnamate, sulfated ethoxylated nonylphenol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. under the trademark ANTI TERRA®. Further examples include, but are not limited to, polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners include, but are not limited to, the methane/ethylene oxide associative thickeners and water soluble carboxylated thickeners, for example, those sold under the UCAR POLYPHOBE trademark by Dow Chemical Company.

Several proprietary antifoaming agents are commercially available, for example, under the trademark BRUBREAK of Buckman Laboratories Inc., under the BYK® trademark of BYK Chemie, U.S.A., under the FOAMASTER® and NOPCO® trademark of Cognis, under the DREWPLUS® trademark of the Drew Industrial Division of Ashland Chemical Company, under the TROYSOL® and TROYKYD® trademarks of Troy Chemical Corporation, and under the SAG® trademark of Dow Chemical Company.

Examples of fungicides, mildewcides, and biocides include, but are not limited to, 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic compounds, tributyl tin oxide, zinc naphthenate, and copper 8-quinolinate.

Examples of U.V. absorbers and U.V. light stabilizers include, but are not limited to, substituted benzophenones, substituted benzotriazoles, hindered amines, and hindered benzoates, available from Cytec Industries under the trademark CYASORB UV, and diethyl-3-acetyl-4-hydroxy-benzyl-phosphonate, 4-dodecyloxy-2-hydroxy benzophenone, and resorcinol monobenzoate.

Such paint or coating additives as described previously form a relatively minor proportion of the coating composition, preferably about 0.05 weight % to about 5.00 weight %.

As a further aspect of the present invention, there is provided a coating composition as set forth previously, further comprising one or more pigments and/or fillers in a concentration of about 0.5 to about 50 weight percent, preferably about 5 to about 30 weight percent, based on the total weight of the components of the coating composition.

Pigments suitable for use in the coating compositions envisioned by the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to the following: CI Pigment Black 7 (carbon black), CI Pigment White 6 (titanium dioxide); CI Pigment Red 101 (red iron Oxide); CI Pigment Yellow 42, CI Pigment Blue 15, 15:1, 15:2, 15:3, 15:4 (copper phthalocyanines); CI Pigment Red 49:1; and CI Pigment Red 57:1.

Both the solvent- and water-based polyfunctional alcohol-modified chlorinated carboxylated polyolefins of the present invention as well as their aforementioned blends with conventional coating formulations to form self-priming compositions may be applied to the substrate by spray application, dipping, or any other means available, which allows for a uniform coating of the polyfunctional alcohol-modified chlorinated carboxylated polyolefin onto the substrate. Subsequent additional coating layers, such as paints, adhesives, and inks, can then be applied on top of the primers of the present invention.

This invention can be further illustrated by the following examples of preferred embodiments thereof, although it will be understood that these examples are included merely for purposes of illustration and are not intended to limit the scope of the invention.

EXAMPLES

The following tests were used to evaluate the performance of the various modified polyolefins of the present invention:
Gasoline Resistance (Abbreviated Description of Ford Modified-Juntunen Method)

Painted test samples are scribed with a sharp knife to make 100 squares. The scribed test samples are immersed in a 45/45/10 isooctane/toluene/ethanol mixture and covered with aluminum foil. After 15 minutes immersion, the test samples are evaluated for number of squares removed or blistered. This is repeated every 15 minutes until the test samples have been immersed for 60 minutes, or all squares are removed. The percent paint retained is reported at each evaluation period as is the degree of lifting of unremoved paint from the substrate.

Cross-Cut Tape Test (Abbreviated Description of ASTM 3359 Method B)

Painted test samples are scribed with a sharp knife to make 25 squares. The center of a piece of tape is placed over the scribed area and the tape is rubbed firmly into place with a pencil eraser or other object. The tape is removed by seizing the free end and by rapidly peeling it back on itself as close to a 90-degree angle as possible. The percent paint retained is reported.

Humidity Resistance (Abbreviated Description of ASTM D 4585)

Test specimens are mounted, with the painted side facing the inside of the Cleveland Humidity cabinet. All cracks are closed between specimens to prevent vapor loss and temperature variation. The thermostat is adjusted to set the vapor temperature at 120° F. The test specimens are removed periodically, and tested by the cross-cut tape test method for adhesion and blister formation.

Comparative Example 1

To a 2-L, 3-neck round bottom flask equipped with a mechanical overhead stirrer, thermocouple, addition funnel, and a condenser with a nitrogen adapter was charged 180.0 grams of polypropylene (Epolene G-3015) and 850 grams of chlorobenzene. The mixture was heated to 110° C. and held at this temperature for 1.5 hours. A solution of benzoyl peroxide (2.5 grams) in chlorobenzene (31.6 grams) was added to a solution of maleic anhydride (9.3 grams) in acetone (13.7 grams). The combined solution was charged to the addition funnel attached to the reaction flask. The solution was charged dropwise over 2.5 hours at 110° C. The reaction mixture was then held an additional 4 hours at 110° C. The pressure was gradually lowered on the system to 364 Torr and held at this level until 125 mL of distillate had been collected. Virgin chlorobenzene (125 mL) was charged back to the reaction flask. The reaction mixture was heated to 117° C. Nitrogen was purged (subsurface) through the reaction mixture via a gas dispersion tube for 30 minutes at a rate of 50 ml/min then increased to 100 ml/min for another 30 minutes. Chlorine (163.2 grams) was charged to the reaction flask via the gas dispersion tube over 13 hours while the reaction temperature was maintained at 116-119° C. The reaction mixture was purged (subsurface) with nitrogen for 30 minutes at a rate of 100 ml/min. The reaction mixture was cooled to 80° C., and the pressure was reduced to initiate distillation of the chlorobenzene solvent. The distillation was continued until the pressure reached 0 Torr at ~93° C. Xylene (932 grams) was charged back to the reaction flask and the resulting mixture was held at 80-60° C. until the chlorinated polymer had completely dissolved. The reaction mixture was filtered to remove insoluble particulates and poured into a glass container. The final solution was 20.0% solids. The acid value of the chlorinated maleated polyolefin was determined to be 22.1 mg KOH/gram (100% solids basis). The chlorine content of the chlorinated maleated polyolefin was determined to be 24.2%. The reaction mixture was reduced to 5% solids in toluene for spray application.

This composition was spray applied as a primer onto thermoplastic olefin (TPO) test plaques and air-dried for 10 minutes. After application of the primer, the panels were top-coated with an OEM melamine-cured 1K white basecoat and an OEM melamine-cured 1K clearcoat. The coated TPO plaques were baked at 250° F. for 40 minutes and aged for 1 week at ambient temperature. Initial adhesion and adhesion after exposure to humidity are reported in Table 1. Gasoline resistance is reported in Table 2.

This composition was spray applied as a primer onto thermoplastic olefin (TPO) test plaques and air-dried for 10 minutes. After application of the primer, the panels were top-coated with an OEM 2K urethane white basecoat and an OEM 2K urethane clearcoat. The coated TPO plaques were baked at 177° F. for 40 minutes and aged for 1 week at ambient temperature. Initial adhesion and adhesion after exposure to humidity are reported in Table 1. Gasoline resistance is reported in Table 2.

This is an example of a chlorinated carboxylated polyolefin containing 24.2 wt.-% chlorine, which has not been modified with a polyfunctional alcohol.

Comparative Example 2

To a 2-L, 3-neck round bottom flask equipped with a mechanical overhead stirrer, thermocouple, addition funnel, and a condenser with a nitrogen adapter was charged 180.0 grams of polypropylene (Epolene G-3015) and 846 grams of chlorobenzene. The mixture was heated to 110° C. and held at this temperature for 1.5 hours. A solution of benzoyl peroxide (2.5 grams) in chlorobenzene (31.6 grams) was added to a solution of maleic anhydride (9.3 grams) in acetone (13.7 grams). The combined solution was charged to the addition funnel attached to the reaction flask. The solution was charged dropwise over 2.5 hours at 110° C. The reaction mixture was then held an additional 4 hours at 110° C. The pressure was gradually lowered on the system to 360 Torr and held at this level until 125 mL of distillate had been collected. Virgin chlorobenzene (125 mL) was charged back to the reaction flask. The reaction mixture was heated to 117° C. Nitrogen was purged (subsurface) through the reaction mixture via a gas dispersion tube for 30 minutes at a rate of 100 ml/min. Chlorine (174.6 grams) was charged to the reaction flask via the gas dispersion tube over 14 hours while the reaction temperature was maintained at 116-119° C. The reaction mixture was purged (subsurface) with nitrogen for 30 minutes at a rate of 100 ml/min. The reaction mixture was cooled to 80° C. and the pressure was reduced to initiate distillation of the chlorobenzene solvent. The distillation was continued until the pressure reached 0 Torr at ~90° C. Xylene (946 grams) was charged back to the reaction flask and the resulting mixture was held at 80-55° C. until the chlorinated maleated polypropylene had completely dissolved. The reaction mixture was filtered to remove insoluble particulates and poured into a glass container. The final solution was 19.9% solids. The acid value of the chlorinated maleated polyolefin was determined to be 23.3 mg KOH/gram (100% solids basis). The chlorine content of the chlorinated maleated polyolefin was determined to be 25.8%. The reaction mixture was reduced to 5% solids in toluene for spray application.

This composition was spray applied as a primer onto thermoplastic olefin (TPO) test plaques and air-dried for 10 minutes. After application of the primer, the panels were topcoated with an OEM melamine-cured 1K white basecoat and an OEM melamine-cured 1K clearcoat. The coated TPO plaques were baked at 250° F. for 40 minutes and aged for 1 week at ambient temperature. Initial adhesion and adhesion after exposure to humidity are reported in Table 1. Gasoline resistance is reported in Table 2.

This composition was spray applied as a primer onto thermoplastic olefin (TPO) test plaques and air-dried for 10 minutes. After application of the primer, the panels were topcoated with an OEM 2K urethane white basecoat and an OEM 2K urethane clearcoat. The coated TPO plaques were baked at 177° F. for 40 minutes and aged for 1 week at ambient temperature. Initial adhesion and adhesion after exposure to humidity are reported in Table 1. Gasoline resistance is reported in Table 2.

This is an example of a chlorinated carboxylated polyolefin containing 25.8 wt.-% chlorine, which has not been modified with a polyfunctional alcohol.

Comparative Example 3

To a 2-L, 3-neck round bottom flask equipped with a mechanical overhead stirrer, thermocouple, addition funnel, and a condenser with a nitrogen adapter was charged 180.0 grams of polypropylene (Epolene G-3015) and 847 grams of chlorobenzene. The mixture was heated to 110° C. and held at this temperature for 1.5 hours. A solution of benzoyl peroxide (1.6 grams) in chlorobenzene (20.0 grams) was added to a solution of maleic anhydride (5.8 grams) in acetone (8.8 grams). The combined solution was charged to the addition funnel attached to the reaction flask. The solution was charged dropwise over 2.5 hours at 110° C. The reaction mixture was then held an additional 4 hours at 110° C. The pressure was gradually lowered on the system to 333 Torr and held at this level until 128 mL of distillate had been collected. Virgin chlorobenzene (128 mL) was charged back to the reaction flask. The reaction mixture was heated to 117° C. Nitrogen was purged (subsurface) through the reaction mixture via a gas dispersion tube for 30 minutes at a rate of 100 ml/min. Chlorine (150.0 grams) was charged to the reaction flask via the gas dispersion tube over 11.5 hours while the reaction temperature was maintained at 116-119° C. The reaction mixture was purged (subsurface) with nitrogen for 30 minutes at a rate of 100 ml/min. The reaction mixture was cooled to 80° C. and the pressure was reduced to initiate distillation of the chlorobenzene solvent. The distillation was continued until the pressure reached 0 Torr at ~78° C. A solvent mixture of Aromatic 100 and toluene (904 g, 82 wt.-% Aromatic 100, 18 wt.-% toluene) was charged back to the reaction flask and the resulting mixture was held at 80-55° C. until the chlorinated polymer had completely dissolved. The reaction mixture was filtered to remove insoluble particulates and poured into a glass container. The final solution was 19.9% solids. The acid value of the chlorinated maleated polyolefin was determined to be 21.0 mg KOH/gram (100% solids basis). The chlorine content of the chlorinated maleated polyolefin was determined to be 23.5%. The reaction mixture was reduced to 5% solids in toluene for spray application.

This composition was spray applied as a primer onto thermoplastic olefin (TPO) test plaques and air-dried for 10 minutes. After application of the primer, the panels were topcoated with an OEM melamine-cured 1K white basecoat and an OEM melamine-cured 1K clearcoat. The coated TPO plaques were baked at 250° F. for 40 minutes and aged for 1 week at ambient temperature. Initial adhesion and adhesion after exposure to humidity are reported in Table 1. Gasoline resistance is reported in Table 2.

This composition was spray applied as a primer onto thermoplastic olefin (TPO) test plaques and air-dried for 10 minutes. After application of the primer, the panels were topcoated with an OEM 2K urethane white basecoat and an OEM 2K urethane clearcoat. The coated TPO plaques were baked at 177° F. for 40 minutes and aged for 1 week at ambient temperature. Initial adhesion and adhesion after exposure to humidity are reported in Table 1. Gasoline resistance is reported in Table 2.

This is an example of a chlorinated carboxylated polyolefin containing 23.5 wt.-% chlorine, which has not been modified with a polyfunctional alcohol.

Example 1

To a 2-L, 3-neck round bottom flask equipped with a mechanical overhead stirrer, thermocouple, and a condenser with a nitrogen adapter was charged 680.8 grams of a chlorinated, maleated polyolefin (20.0% solids in xylene, prepared as described in Comparative Example #1) and 24.2 grams of 2-ethyl-1,3-hexanediol. The mixture was heated to 50° C. and held at this temperature for 7.5 hours. The reaction mixture was poured into a glass container. The reaction mixture was reduced to 5% solids in toluene for spray application.

This composition was spray applied as a primer onto thermoplastic olefin (TPO) test plaques and air-dried for 10 minutes. After application of the primer, the panels were topcoated with an OEM melamine-cured 1K white basecoat and an OEM melamine-cured 1K clearcoat. The coated TPO plaques were baked at 250° F. for 40 minutes and aged for 1 week at ambient temperature. Initial adhesion and adhesion after exposure to humidity are reported in Table 1. Gasoline resistance is reported in Table 2.

This composition was spray applied as a primer onto thermoplastic olefin (TPO) test plaques and air-dried for 10 minutes. After application of the primer, the panels were topcoated with an OEM 2K urethane white basecoat and an OEM 2K urethane clearcoat. The coated TPO plaques were baked at 177° F. for 40 minutes and aged for 1 week at ambient temperature. Initial adhesion and adhesion after exposure to humidity are reported in Table 1. Gasoline resistance is reported in Table 2.

This is an example of a chlorinated carboxylated polyolefin, containing 24.2 wt.-% chlorine, which has been modified with a polyfunctional alcohol to yield an adhesion promoter that provides excellent adhesion of urethane and melamine-cured coatings onto polyolefin surfaces and provides excellent humidity resistance and gasoline resistance.

Example 2

To a 2-L, 3-neck round bottom flask equipped with a mechanical overhead stirrer, thermocouple, and a condenser with a nitrogen adapter was charged 639.4 grams of a chlorinated, maleated polyolefin (19.9% solids in xylene, prepared as described in Comparative Example #2) and 22.4 grams of 2-ethyl-1,3-hexanediol. The mixture was heated to 50° C. and held at this temperature for 8.0 hours. The reaction mixture was poured into a glass container. The reaction mixture was reduced to 5% solids in toluene for spray application.

This composition was spray applied as a primer onto thermoplastic olefin (TPO) test plaques and air-dried for 10 minutes. After application of the primer, the panels were topcoated with an OEM melamine-cured 1K white basecoat and an OEM melamine-cured 1K clearcoat. The coated TPO plaques were baked at 250° F. for 40 minutes and aged for 1 week at ambient temperature. Initial adhesion and adhesion after exposure to humidity are reported in Table 1. Gasoline resistance is reported in Table 2.

This composition was spray applied as a primer onto thermoplastic olefin (TPO) test plaques and air-dried for 10 minutes. After application of the primer, the panels were topcoated with an OEM 2K urethane white basecoat and an OEM 2K urethane clearcoat. The coated TPO plaques were baked at 177° F. for 40 minutes and aged for 1 week at ambient temperature. Initial adhesion and adhesion after exposure to humidity are reported in Table 1. Gasoline resistance is reported in Table 2.

This is an example of a chlorinated carboxylated polyolefin, containing 25.8 wt.-% chlorine, which has been modified with a polyfunctional alcohol to yield an adhesion promoter that provides excellent adhesion of urethane and melamine-cured coatings onto polyolefin surfaces and provides excellent humidity resistance and gasoline resistance.

Example 3

To a 2-L, 3-neck round bottom flask equipped with a mechanical overhead stirrer, thermocouple, and a condenser with a nitrogen adapter was charged 678.6 grams of a chlorinated, maleated polyolefin (19.9% solids in xylene, prepared as described in Comparative Example #3) and 18.4 grams of 2-ethyl-1,3-hexanediol. The mixture was heated to 50° C. and held at this temperature for 7.0 hours. The reaction mixture was poured into a glass container. The reaction mixture was reduced to 5% solids in toluene for spray application.

This composition was spray applied as a primer onto thermoplastic olefin (TPO) test plaques and air-dried for 10 minutes. After application of the primer, the panels were topcoated with an OEM melamine-cured 1K white basecoat and an OEM melamine-cured 1K clearcoat. The coated TPO plaques were baked at 250° F. for 40 minutes and aged for 1 week at ambient temperature. Initial adhesion and adhesion after exposure to humidity are reported in Table 1. Gasoline resistance is reported in Table 2.

This composition was spray applied as a primer onto thermoplastic olefin (TPO) test plaques and air-dried for 10 minutes. After application of the primer, the panels were topcoated with an OEM 2K urethane white basecoat and an OEM 2K urethane clearcoat. The coated TPO plaques were baked at 177° F. for 40 minutes and aged for 1 week at ambient temperature. Initial adhesion and adhesion after exposure to humidity are reported in Table 1. Gasoline resistance is reported in Table 2.

This is an example of a chlorinated carboxylated polyolefin, containing 23.5 wt.-% chlorine, which has been modified with a polyfunctional alcohol to yield an adhesion promoter that provides excellent adhesion of urethane and melamine-cured coatings onto polyolefin surfaces and provides excellent humidity resistance and gasoline resistance.

TABLE 1

Initial Adhesion and Adhesion after Humidity Exposure

| Example | Coating System | Initial Adhesion | Adhesion at 24 Hours | Blisters at 24 Hours | Adhesion at 168 Hours | Blisters at 168 Hours |
|---|---|---|---|---|---|---|
| Comparative Example #1 | 1K/1K | 100% | 100% | 8 F | 100% | 8 F |
|  | 2K/2K | 100% | 100% | 0 | 100% | 0 |
| Example #1 | 1K/1K | 100% | 100% | 0 | 100% | 8 F |
|  | 2K/2K | 100% | 100% | 0 | 100% | 0 |
| Comparative Example #2 | 1K/1K | 100% | 100% | 8 F | 100% | 8 F |
|  | 2K/2K | 100% | 100% | 0 | 100% | 8 F |
| Example #2 | 1K/1K | 100% | 100% | 0 | 100% | 0 |
|  | 2K/2K | 100% | 100% | 0 | 100% | 8 F |
| Comparative Example #3 | 1K/1K | 100% | 100% | 0 | 100% | 6–8 F |
|  | 2K/2K | 100% | 100% | 0 | 100% | 8 F |
| Example #3 | 1K/1K | 100% | 100% | 0 | 100% | 8 F |
|  | 2K/2K | 100% | 100% | 0 | 100% | 0 |

TABLE 2

Adhesion After Exposure to Gasoline

| Example | Coating System | 15 Minutes | | 30 Minutes | | 45 Minutes | | 60 Minutes | |
|---|---|---|---|---|---|---|---|---|---|
|  |  | % Retention | % Lift | % Retention | % Lift | % Retention | % Lift | % Retention | % Lift |
| Comparative. Example #1 | 1K/1K | 100 | 0 | 100 | 17 | 92 | 80 | 67 | 100 |
|  | 2K/2K | 100 | 0 | 100 | 0 | 100 | 0 | 100 | 0 |
| Example #1 | 1K/1K | 100 | 0 | 100 | 0 | 100 | 0 | 100 | 0 |
|  | 2K/2K | 100 | 0 | 100 | 0 | 100 | 0 | 100 | 0 |
| Comparative Example #2 | 1K/1K | 100 | 0 | 100 | 13 | 90 | 23 | 47 | 83 |
|  | 2K/2K | 100 | 0 | 100 | 0 | 100 | 0 | 100 | 0 |
| Example #2 | 1K/1K | 100 | 0 | 100 | 0 | 100 | 0 | 100 | 0 |
|  | 2K/2K | 100 | 0 | 100 | 0 | 100 | 0 | 100 | 0 |
| Comparative Example #3 | 1K/1K | 100 | 0 | 100 | 0 | 100 | 3 | 100 | 3 |
|  | 2K/2K | 100 | 0 | 100 | 10 | 93 | 33 | 57 | 50 |
| Example #3 | 1K/1K | 100 | 0 | 100 | 0 | 100 | 0 | 100 | 0 |
|  | 2K/2K | 100 | 0 | 100 | 0 | 100 | 0 | 100 | 0 |

Example 4

To a 1-L, 4-neck round bottom flask equipped with a mechanical overhead stirrer, thermocouple, and a condenser with a nitrogen adapter was charged 273.2 grams of a diol-modified, chlorinated, maleated polyolefin (19.7% solids in xylene, prepared as described in Example #1) and 13.5 grams of Triton N-101 (a nonionic surfactant, product of Dow Chemical Company). The mixture was heated to 85° C., and the pressure was reduced to initiate distillation of the xylene solvent. The distillation was continued until the pressure reached ~20 Torr at 80° C. The pressure was adjusted to atmospheric pressure and a warm (~50° C.) solution of N,N-dimethylethanolamine (2.65 grams, DMEA) in deionized water (356 grams) was charged from an addition funnel to the molten polymer over 15 minutes while maintaining the temperature inside the flask at 70-90° C. The contents of the flask were heated to distill out residual xylene in the form of a xylene-water azeotrope. After collecting a total of 48 mL of distillate, the contents of the flask were cooled to 30° C. The resulting dispersion was filtered through a 100 micron polyester filter to remove solid residue that had not been dispersed and poured into a glass container. The final dispersion was 16.5% solids and had a pH of 8.8.

This is an example of a diol-modified, chlorinated, maleated polyolefin that has been dispersed into water.

The invention has been described in detail with particular reference to preferred embodiments thereof, but it will be understood that variations and modifications can be effected within the spirit and scope of the invention.

We claim:

1. A polyfunctional alcohol-modified chlorinated carboxylated polyolefin, comprising the reaction product of:
    at least one chlorinated carboxylated polyolefin and
    at least one polyfunctional alcohol selected from the group consisting of polyfunctional alcohols having one primary hydroxyl group and one secondary or tertiary hydroxyl group, and polyfunctional alcohols based on 1,3-propanediol which are doubly substituted at the middle carbon position (C-2); wherein said polyolefin is selected from the group consisting of ethylene copolymers prepared from monomers selected from the group consisting of ethylene and alpha olefins having 3 to about 10 carbon atoms; polypropylene; propylene copolymers prepared from monomers selected from the group consisting of propylene, ethylene, and alpha olefins having from 4 to about 10 carbon atoms; poly(1-butene); 1-butene copolymers prepared from monomers selected from the group consisting of 1-butene, ethylene, and alpha olefins having 3 to about 10 carbons atoms; and propylene terpolymers prepared from monomers selected from the group consisting of propylene, ethylene, and alpha olefins having from 4 to about 10 carbons atoms,
    wherein at least one hydroxyl group of the polyfunctional alcohol remains unreacted with the chlorinated carboxylated polyolefin.

2. The polyfunctional alcohol-modified chlorinated carboxylated polyolefin of claim 1, wherein the chlorinated carboxylated polyolefin is the reaction product of:
    at least one polyolefin polymer selected from the group consisting of: ethylene copolymers prepared from monomers selected from the group consisting of ethylene and alpha olefins having 3 to about 10 carbon atoms; polypropylene; propylene copolymers prepared from monomers selected from the group consisting of propylene, ethylene, and alpha olefins having from 4 to about 10 carbon atoms; poly(1-butene); propylene terpolymers prepared from monomers selected from the group consisting of propylene, ethylene, and alpha olefins having from 4 to about 10 carbon atoms; and 1-butene copolymers prepared from monomers selected from the group consisting of 1-butene, ethylene, and alpha olefins having 3 to about 10 carbon atoms; and
    at least one monomer selected from the group consisting of an unsaturated carboxylic acid ester, an unsaturated carboxylic acid, an unsaturated carboxylic anhydride, and an acrylic monomer and chlorine.

3. The polyfunctional alcohol-modified chlorinated carboxylated polyolefin of claim 2, wherein the at least one monomer includes at least one member selected from the group consisting of maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate, and mixtures thereof.

4. The polyfunctional alcohol-modified chlorinated carboxylated polyolefin of claim 2, wherein the weight of said at least one monomer is in the range of from about 1 to about 25 weight percent based on the weight of polyolefin polymer.

5. The polyfunctional alcohol-modified chlorinated carboxylated polyolefin of claim 2, wherein the weight of said at least one monomer is in the range of from about 2 to about 20 weight percent based on the weight of polyolefin polymer.

6. The polyfunctional alcohol-modified chlorinated carboxylated polyolefin of claim 2, wherein the weight of said at least one monomer is in the range of from about 4 to about 18 weight percent based on the weight of the polyolefin polymer.

7. The polyfunctional alcohol-modified chlorinated carboxylated polyolefin of claim 1, wherein the chlorinated carboxylated polyolefin has a chlorine content of from about 1 to about 40 weight percent based on the weight of the chlorinated carboxylated polyolefin.

8. The polyfunctional alcohol-modified chlorinated carboxylated polyolefin of claim 1, wherein the chlorinated carboxylated polyolefin has a chlorine content of from about 5 to about 35 weight percent based on the weight of the chlorinated carboxylated polyolefin.

9. The polyfunctional alcohol-modified chlorinated carboxylated polyolefin of claim 1, wherein the polyfunctional alcohol is at least one member selected from the group consisting of 2-ethyl-1,3-hexanediol, 2,2,4-trimethyl-1,3-pentanediol, and 1,2-propylene glycol.

10. The polyfunctional alcohol-modified chlorinated carboxylated polyolefin of claim 1, wherein the polyfunctional alcohol comprises two primary hydroxyl groups separated by a carbon containing 2 alkyl groups.

11. The polyfunctional alcohol-modified chlorinated carboxylated polyolefin of claim 10, wherein the polyfunctional alcohol is at least one member selected from the group consisting of 2,2-diethyl-1,3-propanediol, 2,2-dibutyl-1,3-propanediol, 2-methyl-2-propyl-1,3-propanediol, 2-butyl-2-ethyl-1,3-propanediol, and neopentyl glycol.

12. A process for producing a polyfunctional alcohol-modified chlorinated carboxylated polyolefin comprising:
    reacting at least one chlorinated carboxylated polyolefin and at least one polyfunctional alcohol selected from the group consisting of polyfunctional alcohols having one primary hydroxyl group and one secondary or tertiary hydroxyl group, and polyfunctional alcohols based on 1,3-propanediol which are doubly substituted at the middle carbon position (C-2), wherein at least one hydroxyl croup of the polyfunctional alcohol remains unreacted with the chlorinated carboxylated polyolefin; and wherein said polyolefin is selected from the group consisting of ethylene copolymers prepared from monomers selected from the group consisting of ethylene and alpha olefins having 3 to about 10 carbon atoms; polypropylene; propylene copolymers prepared from monomers selected from the group consisting of propylene, ethylene, and alpha olefins having from 4 to about 10 carbon atoms; poly(1-butene); 1-butene copolymers prepared from monomers selected from the group consisting of 1-butene, ethylene, and alpha olefins having 3 to about 10 carbons atoms; and propylene terpolymers prepared from monomers selected from the group consisting of propylene, ethylene, and alpha olefins having from 4 to about 10 carbons atoms.

13. A process according to claim 12 wherein said chlorinated carboxylated polyolefin is produced by first contacting a polyolefin with at least one monomer selected from the group consisting of an unsaturated carboxylic acid ester, an unsaturated carboxylic acid, an unsaturated carboxylic anhydride, and an acrylic monomer to produce a carboxylated polyolefin and then contacting said carboxylated polyolefin with at least one chlorinating agent to produce said chlorinated carboxylated polyolefin.

14. A process according to claim 12 wherein said carboxylated polyolefin is produced by a solution or extrusion process.

15. A process according to claim 14 wherein the solvent utilized in the solution process for carboxylation is utilized in the subsequent chlorination.

16. A process according to claim 14 wherein a different solvent is utilized in the chlorination than in the solution process for carboxylation.

17. A process according to claim 14 wherein said carboxylated polyolefin produced in said extrusion process is dissolved in at least one solvent for the subsequent chlorination to produce said chlorinated carboxylated polyolefin.

18. A process according to claim 12 wherein said chlorinated carboxylated polyolefin is produced by first contacting a polyolefin with at least one chlorinating agent to produce a chlorinated polyolefin and then contacting said chlorinated polyolefin with at least one monomer selected from the group consisting of an unsaturated carboxylic acid ester, an unsaturated carboxylic acid, an unsaturated carboxylic anhydride, and an acrylic monomer to produce said chlorinated carboxylated polyolefin.

19. A process according to claim 18 wherein said chlorinated polyolefin is contacted with said monomer in a solution process to produce said chlorinated carboxylated polyolefin.

20. A process according to claim 19 wherein the solvent utilized in the solution process for chlorination is utilized in the subsequent carboxylation.

21. A process according to claim 19 wherein a different solvent is utilized in the chlorination than in the solution process for carboxylation.

22. A process according to claim 12 wherein said contacting of said chlorinated carboxylated polyolefin with said polyfunctional alcohol is carried out in the presence of a solvent.

23. A process according to claim 22 wherein said contacting is conducted at temperatures in the range of about 10° C. to about 200° C.

24. A process according to claim 22 wherein said solvent is the same as utilized to prepare said chlorinated carboxylated polyolefin.

25. A process according to claim 22 wherein said solvent is different than the solvent utilized to prepare said chlorinated carboxylated polyolefin.

26. A process according to claim 12 wherein a catalyst is utilized to react said chlorinated carboxylated polyolefin with said polyfunctional alcohol.

27. A process according to claim 26 wherein said catalyst is an alkyl or arylalkyl sulfonic acid.

28. A process according to claim 12 wherein excess polyfunctional alcohol is utilized to produce the corresponding diester.

29. A solvent-based primer composition, comprising the polyfunctional alcohol-modified chlorinated carboxylated polyolefin of claim 1 and a solvent.

30. The solvent-based primer composition of claim 29, wherein the solvent includes at least one member selected from the group consisting of an ester solvent, a ketone solvent, an aliphatic solvent, an aromatic solvent, and mixtures thereof.

31. A water-based primer composition, comprising:
the reaction product of an amine or inorganic base with a polyfunctional alcohol modified chlorinated carboxylated polyolefin;
water; and,
optionally, a surfactant,
wherein said polyfunctional alcohol modified chlorinated carboxylated polyolefin comprises the reaction product of:
at least one chlorinated carboxylated polyolefin; and
at least one polyfunctional alcohol selected from the group consisting of polyfunctional alcohols having one primary hydroxyl group and one secondary or tertiary hydroxyl group, and polyfunctional alcohols based on 1,3-propanediol which are doubly substituted at the middle carbon position (C-2); wherein said polyolefin is selected from the group consisting of ethylene copolymers prepared from monomers selected from the group consisting of ethylene and alpha olefins having 3 to about 10 carbon atoms; polypropylene; propylene copolymers prepared from monomers selected from the group consisting of propylene, ethylene, and alpha olefins having from 4 to about 10 carbon atoms; poly(1-butene); 1-butene copolymers prepared from monomers selected from the group consisting of 1-butene, ethylene, and alpha olefins having 3 to about 10 carbons atoms; and propylene terpolymers prepared from monomers selected from the group consisting of propylene, ethylene, and alpha olefins having from 4 to about 10 carbons atoms.

32. The water-based primer composition of claim 31, wherein the surfactant is present and is a nonionic surfactant.

33. The water-based primer composition of claim 32, wherein the amine is an aliphatic amine.

34. The water-based primer composition of claim 33, wherein the amine is at least one member selected from the group consisting of ammonia, ammonium hydroxide, triethylamine, diethylamine, monoisopropanolamine, morpholine, ethanolamine, diethanolamine, triethanolamine, N,N-dimethylethanolamine, N,N-diethylethanolamine, 2-amino-2-methyl-1-propanol, and N-methyldiethanolamine.

35. A primer composition, comprising:
at least one coating resin;
the polyfunctional alcohol-modified chlorinated carboxylated polyolefin of claim 1;
and optionally, one or more additives selected from the group consisting of a leveling agent, a rheology agent, a flow control agent; an associative thickener, a flatting agent, a pigment wetting and dispersing agent, a surfactant, an ultraviolet (UV) absorber, an ultraviolet (UV) light stabilizer, a tinting pigment, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, and a coalescing agent.

36. The primer composition of claim 35 further comprising at least one pigment.

37. The primer composition of claim 35 wherein the coating resin is selected from the group consisting of polyesters, alkyds, acrylics, acrylic-modified alkyds, styrene-acrylics, urethanes, and epoxies.

38. An article of manufacture, comprising a shaped or formed article substrate having coated thereon a primer coating comprising the solvent-based primer composition of claim 29, and optionally a paint topcoat comprising a coating composition.

39. The article of claim 38, wherein the coating composition comprises at least one coating resin selected from the group consisting of polyesters, alkyds, acrylics, acrylic-modified alkyds, styrene-acrylics, urethanes, and epoxies.

40. The article of claim 38, wherein said article substrate comprises metal or plastic.

41. An article of manufacture, comprising a shaped or formed article substrate having coated thereon a primer coating comprising the water-based primer composition of claim 31, and optionally a paint topcoat comprising a coating composition.

42. The article of claim 41, wherein the coating composition comprises at least one coating resin selected from the group consisting of polyesters, alkyds, acrylics, acrylic-modified alkyds, styrene-acrylics, urethanes, and epoxies.

43. The article of claim 42, wherein said article substrate is metal or plastic.

44. An article of manufacture, comprising a shaped or formed article substrate having coated thereon a primer coating comprising the primer composition of claim 35, and optionally a paint topcoat comprising a coating composition.

45. The article of claim 44, wherein the coating composition comprises at least one coating resin selected from the group consisting of polyesters, alkyds, acrylics, acrylic-modified alkyds, styrene-acrylics, urethanes, and epoxies.

46. The article of claim 45, wherein said substrate article comprises metal or plastic.

47. An adhesive composition, comprising an adhesive and the polyfunctional alcohol-modified chlorinated carboxylated polyolefin of claim 1.

48. An ink composition, comprising an ink composition and the polyfunctional alcohol-modified chlorinated carboxylated polyolefin of claim 1.

49. A primer composition, comprising:
at least one coating resin;
the polyfunctional alcohol-modified chlorinated carboxylated polyolefin of claim 1;
and optionally, one or more additives selected from the group consisting of a leveling agent, a rheology agent, a flow control agent; an associative thickener, a flatting agent, a pigment wetting and dispersing agent, a surfactant, an ultraviolet (UV) absorber, an ultraviolet (UV) light stabilizer, a tinting pigment, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, and a coalescing agent;
wherein said primer composition has improved gasoline resistance over primer compositions that do not contain said polyfunctional alcohol-modified chlorinated carboxylated polyolefin.

50. The article of claim 38, wherein said primer coating is dried.

51. The article of claim 44, wherein said primer coating is dried.

* * * * *